United States Patent [19]

Boundy

[11] Patent Number: 4,861,208

[45] Date of Patent: Aug. 29, 1989

[54] DOOR TRIM PANEL FASTENING ASSEMBLY

[75] Inventor: Timothy M. Boundy, Auburn Hills, Mich.

[73] Assignee: Chrysler Motors Corporation, Highland Park, Mich.

[21] Appl. No.: 303,206

[22] Filed: Jan. 30, 1989

[51] Int. Cl.[4] .................... F16B 21/00; E04F 19/02
[52] U.S. Cl. .................... 411/339; 411/510; 411/908; 24/297
[58] Field of Search ............... 411/338, 339, 508–510, 411/512, 913, 907, 908, 82; 24/297, 453

[56] References Cited

U.S. PATENT DOCUMENTS

| 4,176,428 | 12/1979 | Kimura | 24/297 |
| 4,716,633 | 1/1988 | Rizo | 24/297 |

FOREIGN PATENT DOCUMENTS

| 1314506 | 12/1962 | France | 411/510 |
| 1375585 | 10/1964 | France | 411/508 |
| 2561726 | 9/1985 | France | 411/82 |
| 56-31444 | 4/1981 | Japan | 411/508 |

*Primary Examiner*—Neill R. Wilson
*Attorney, Agent, or Firm*—Edward A. Craig

[57] ABSTRACT

The present invention is a fastening assembly for securing a door trim panel to a door body inner panel. The assembly includes a male member having a head portion adapted to be removably secured to a slot in the door trim panel. The male member has a cylindrical portion having a plurality of barbs spaced longitudinally along the cylindrical portion. The assembly also includes a female member having means for removably securing the female member to the door body inner panel. The female member has a cylindrical portion with a longitudinal axis and a pocket formed therein along the longitudinal axis. The pocket includes a means for engaging a groove between a pair of adjacent barbs on the male member for adjusting the door trim panel relative to the door body inner panel.

1 Claim, 2 Drawing Sheets

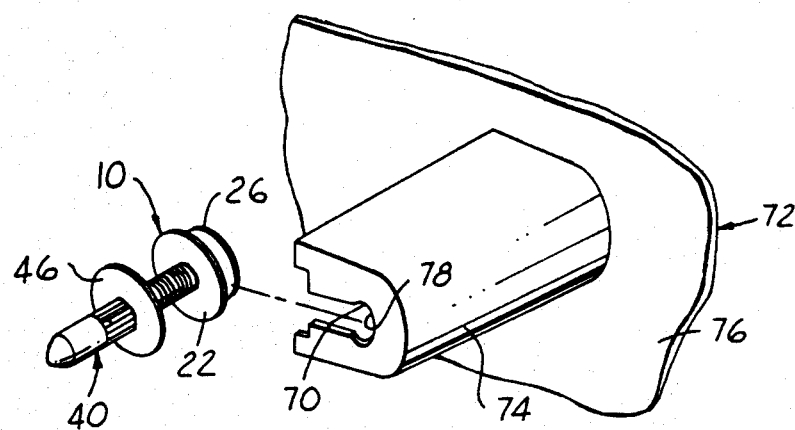
FIG.8
FIG.9
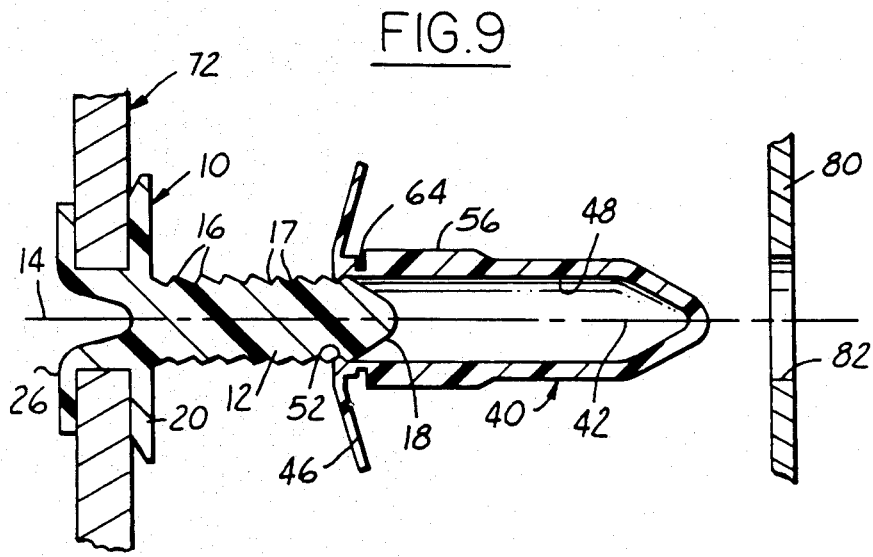
FIG.10
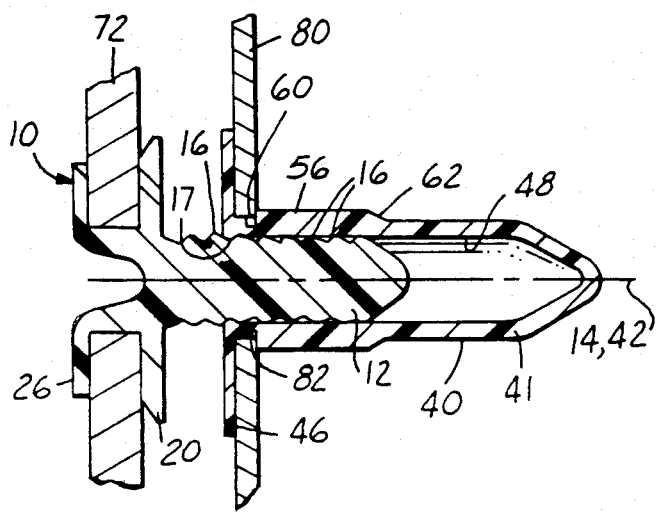

DOOR TRIM PANEL FASTENING ASSEMBLY

BACKGROUND OF THE INVENTION

1. Field of the Invention

The present invention relates generally to a fastening assembly, more particularly, to a fastening assembly for a door trim panel.

2. Description of Related Art

Presently, door trim panels are commonly manufactured from a plastic material. As a result, the door trim panels may be wavy or warped after manufacture and prior to assembly. Previously, a metal fastener with a spring arm attached to the door trim panel was disposed in a corresponding aperture of a door body inner panel to mount the door trim panel to the door body inner panel.

One problem with the metal fastener is that it was prone to corrosion and failure. Another problem with the metal fastener is that no seal is provided about the metal fastener or the aperture in the door body inner panel, thereby allowing moisture to enter and corrode the door body inner panel. A further problem is that the metal fastener was unsuitable for different dimensional thicknesses of door body inner panels on various vehicle lines. Another problem of the metal fastener was that the fastener could not be positively locked to the door body inner panel. A further problem of the metal fastener was that the fastener could not be removed for repeated service.

SUMMARY OF THE INVENTION

A fastening assembly for securing a door trim panel to a door body inner panel includes a male member having a head portion adapted to be removably secured to the door trim panel. The male member has a cylindrical portion. The fastening assembly also includes a female member having means for removably securing the female member to the door body inner panel. The female member has a cylindrical portion with a longitudinal axis. The cylindrical portion has a pocket formed therein along the longitudinal axis for receiving the cylindrical portion of the male member. The assembly includes means for adjusting the male member relative to the female member to vary the distance between the door trim panel and door body inner panel.

The means comprises a plurality of barbs spaced longitudinally along the cylindrical portion and the pocket includes means for engaging a groove between a pair of adjacent barbs.

The assembly is characterized by the engaging means comprising an annular ring extending radially inwardly into the pocket.

The assembly is further characterized by the female member having a sealing flange at one end of the cylindrical portion and adapted to abut the door body inner panel to prevent contaminants from entering the aperture in the door body inner panel. The female member also includes a plurality of circumferentially spaced and longitudinally extending ribs extending radially outwardly from the cylindrical portion. A plurality of longitudinally extending slots are formed in the cylindrical portion, each of the slots being disposed between an adjacent pair of ribs to allow the ribs to be deflected radially inwardly. An annular groove is formed between the first end of the ribs and the sealing portion. The door body inner panel is received in the groove and retained between the first end of the ribs and the sealing portion.

The male member includes a sealing flange extending outwardly from the cylindrical portion at one end of the barbs. The male member also includes a gripping flange extending radially outwardly and spaced longitudinally from the sealing flange. The male member further includes an annular head portion formed between and having a diameter less than the diameter of the gripping flange and sealing flange and adapted to be disposed in a slot formed in the door trim panel such that the door trim panel is disposed between the gripping flange and sealing flange.

The assembly is further characterized by the male and female member being made of a plastic material.

In accordance with the present invention, a fastening assembly is provided which includes a seal for protecting the door body inner panel from the environment. The fastening assembly allows the door trim panel to be securely and positively fastened at many contact points to the door body inner panel. The fastening assembly is also made of a plastic material which prevents failure due to corrosion and provides the resiliency for repeated service. Additionally, the present invention provides easier mounting and is suitable for different dimensional thicknesses of the door body inner panels.

DESCRIPTION OF THE DRAWINGS

FIG. 8 is an exploded perspective view of the door trim panel fastener of FIGS. 1 through 4 and a door trim panel;

FIG. 9 is a sectional view of the door trim panel fastener and door trim panel prior to assembly to a door body inner panel; and FIG. 10 is a view similar to FIG. 9 illustrating the trim panel and associated fastener in assembled relationship with a door body inner panel.

BRIEF DESCRIPTION OF A PREFERRED EMBODIMENT

Figure 1:
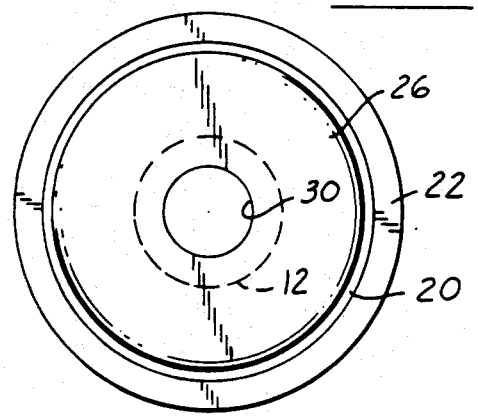
FIG. 1 is a front elevational view of a male member of a door trim panel fastener forming one embodiment of the present invention.
Figure 2:
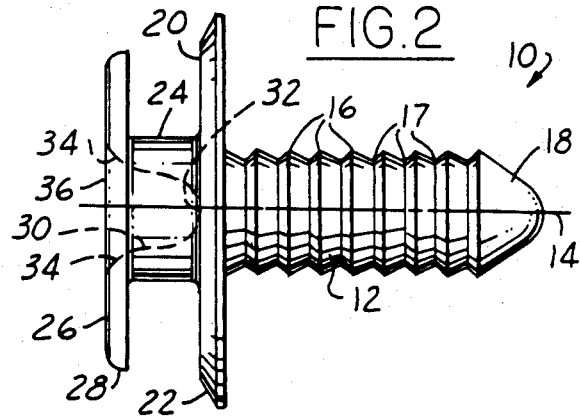
FIG. 2 is a side elevational view of the male member of FIG. 1.
Figure 4:
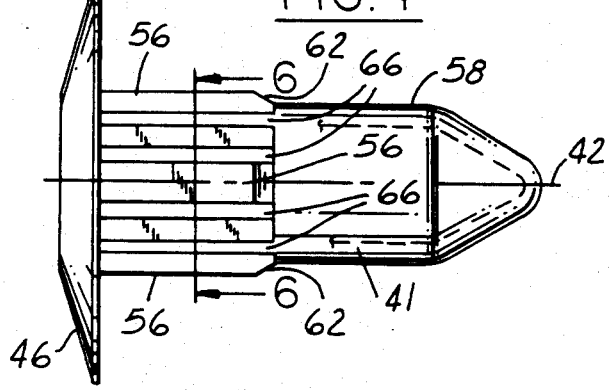
FIG. 4 is a side elevational view of the female receptacle of FIG. 3.
Figure 3:
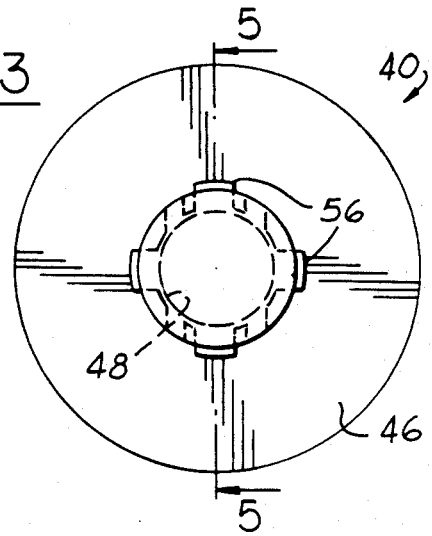
FIG. 3 is a front elevational view of one embodiment of a female receptacle for the male member of the door trim panel fastener of FIGS. 1 and 2.
Figure 5:
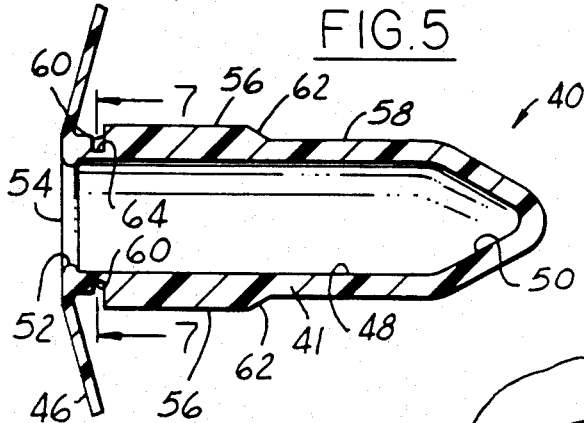
FIG. 5 is a sectional view taken substantially along the line 5—5 of FIG. 3 looking in the direction of the arrows.
Figure 6:
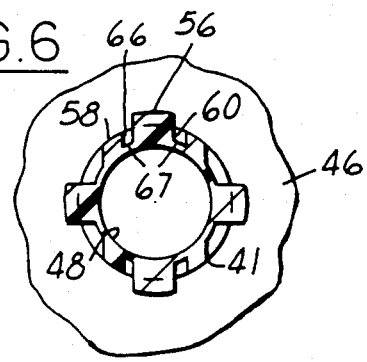
FIG. 6 is a sectional view taken substantially along the line 6—6 of FIG. 4 looking in the direction of the arrows.
Figure 7:
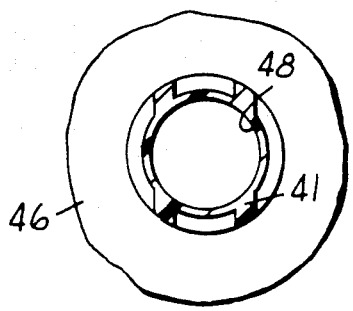
FIG. 7 is a sectional view taken substantially along the line 7—7 of FIG. 5 looking in the direction of the arrows.

Referring to FIGS. 1 and 2, a fastener or male member 10 of a door trim panel fastening assembly according to the present invention is shown. The male member 10 includes a generally elongated cylindrical portion 12 having a longitudinal axis 14. The cylindrical portion 12 includes a plurality of "Christmas tree" like barbs 16 forming the outer surface along the longitudinal length of the cylindrical portion 12. The barbs 16 extend radially outwardly from the cylindrical portion 12 and a generally annular groove 17 is formed between pairs of adjacent barbs 16. The cylindrical portion 12 also includes a generally "V" shaped rounded point 18 at one end and a generally annular or circular radially outwardly extending sealing flange 20 at the other end. The sealing flange 20 is generally planar and perpendicular to the longitudinal axis 14. The sealing flange 20 has inclined or sloping edges 22 at its radial free end.

The male member 10 also includes a head portion 24 which is generally annular and radially outwardly extending from the longitudinal axis 14 on the other side of the sealing flange 20. A gripping flange 26 which is generally annular extends radially outwardly from the end of the head portion 24. The gripping flange 26 has a diameter larger than the head portion 24 but smaller than the sealing flange 20. The gripping flange 26 is generally planar and perpendicular to the longitudinal axis 14. The gripping flange 26 has arcuate longitudinally extending edges 28 at its radial free end.

The male member 10 further includes a longitudinally extending cavity or pocket 30 formed in the gripping flange 26 and head portion 24. The cavity 30 is generally "V" shaped with a rounded or arcuate bottom 32 and smooth arcuate or rounded corners 34 at its opening 36. The male member 10 is preferably made of a plastic material such as polypropylene or nylon.

Referring to FIGS. 3 through 7, a receiving fastener or female member 40 of the door trim panel fastener according to the present invention is shown. The female member 40 includes a generally elongated cylindrical portion 41 having a longitudinal axis 42. The cylindrical portion 41 has one end which is "V" shaped or forms a point 44 which is arcuate or rounded. The cylindrical portion 41 has at the other end a seal portion 46 extending radially outwardly. The seal portion 46 also extends longitudinally such that it appears inclined or sloping at an angle to the longitudinal axis 42 to form an "umbrella" configuration. The female member 40 is preferably made of a plastic material such as polypropylene or nylon to allow the seal portion 46 to have some degree of flexibility to be axially deformed and resilient enough to return to its original position shown in FIG. 4 and FIG. 5. The seal portion 46 provides a weather tight seal to resist moisture and contaminants from entering the aperture (not shown) formed in the door body inner panel (not shown).

The female member 40 also includes a generally cylindrical pocket 48 formed along the longitudinal axis 42 and has a generally "V" shaped arcuate or rounded point bottom 50. The pocket 48 extends from one end of the female member and terminates short of the other end thereof. A generally annular ring 52 extends radially inwardly into the pocket 48 at the opening 54 of the pocket 48 for engaging the grooves 17 of the male member 10 to releasably retain the cylindrical portion 12 of the male member 10 within the pocket 48 of the female member 40.

The female member 40 further includes a plurality of circumferentially spaced and longitudinally extending ribs 56 along the outer surface 58 of the cylindrical portion 41. The ribs 56 extend radially outwardly from the outer surface 58 of the female member 40. The ribs 56 have a first end 60 spaced from the seal portion 46. The ribs 56 extend longitudinally along the cylindrical portion 41 for about half its length to a second end 62 which is inclined radially inwardly relative to the longitudinal axis 42. The female member 40 also includes a slot or groove 64 extending radially inwardly from the outer surface 58 of the cylindrical member 41 at the first end 60 of the ribs 56 to allow the first end 60 to deflect axially. The door body inner panel (not shown) is disposed between the first end 60 and the seal portion 46. The female member 40 also includes a pair of longitudinally extending grooves or slots 66 circumferentially spaced on each side of a rib 56. As noted in FIG. 6, a web 67 is formed at the bottom of the slots 66 between the rib 56 and remainder of the cylindrical portion 41. The grooves 66 allow deflection radially inwardly of the first end 60 of the rib 56.

Referring to FIG. 8, the head portion 24 of the male member 10 is press-fitted or removably disposed in a slot 70 of a door trim panel, generally indicated at 72. The slot 70 has a shape similar to a "keyhole." The door trim panel 72 typically has a projection 74 extending outwardly from a generally flat or planar base 76. The slot 70 is formed at the free end of the projection 74. The slot 70 has a generally circular portion 78 which has a diameter greater than the width of the slot 70. The slot 70 has a width which is slightly less than the diameter of the head portion 24. Thus, as head portion 24 is slid into the slot 70, deflecting the sides of the projection 74 forming the slot 70, will be deflected slightly and therefore spring back so as to retain head portion 24 with circular portion 78.

As illustrated in FIG. 9, the thickness of the material of the door trim panel 72 is such to fit between the gripping flange 26 and sealing flange 20. The flanges 20 and 26 prevent relative axial movement between the door trim panel 72 and male member 10. A door body inner panel 80 which is typically made of sheet metal has a generally circular aperture 82 formed in the panel 80. The V-shaped end 18 of the male member 10 attached to the door trim panel 72 is disposed in the pocket 48 of the female member 40 such that the ring 52 engages a first groove 17 between the first pair of barbs 16 near the V-shaped end 18. This allows the male member 10 and female member 40 to be releasably retained together during installation. The longitudinal axes 14 and 42 are axially aligned with the aperture 82 of the door body inner panel 80 prior to installation.

Referring to FIG. 10, the members 10 and 40 are press-fitted into the aperture 82 of the door body inner panel 80. As such, the female member 40 is disposed in the aperture 82. The ribs 56 are deflected radially inwardly until the door body inner panel 80 is disposed between the sealing portion 46 and the first end 60 of the ribs 56. The ribs 56 then deflect radially outwardly to substantially their original position to lock the door body inner panel 80 between the sealing portion 46 and the first end 60 of the ribs 56. The sealing portion 46 is "flattened out" and abuts the door body inner panel 80 to prevent contaminants and moisture from entering the aperture 82. The cylindrical portion 12 of the male member 10 is disposed in the pocket 48 of the female member 40 such that the ring 52 engages a corresponding groove 17 between a pair of adjacent barbs 16 to adjust the door trim panel 72 at different depths relative to the door body inner panel 80. The ring 52 moves along the barbs 16 to expand the opening 54 to allow the cylindrical portion 12 of the male member 10 to be disposed in the pocket 48 of the female member 40. The resiliency of the plastic material for the female member 40 returns the opening 54 to substantially its original position when the ring 52 engages a groove 17. The operation is reversed for removing the members 10 and 40.

In accordance with the present invention, the ring 52 is preferably stiff enough to enable the female member 40 to be installed in the aperture 82 of the door body inner panel 80 before the male member 10 starts to move deeper or farther into the pocket 48 of the female member 40. This arrangement enables the fastener system to be initially assembled to the trim panel 72 first and then the entire assembly installed on the body inner panel simultaneously thus eliminating the need to separately assemble each component. When fully installed, the male member 10 keeps the female member 90 from separating or coming out of the aperture 82 in the door body inner panel 80. This results from the cylindrical portion 12 substantially filling the pocket 48 to prevent radial inward deformation of the female member 40. Additionally, the male member 10 and female member 40 form a fastening assembly made of a plastic material which prevents failure due to corrosion and provides the resiliency for repeated service.

The present invention has been described in an illustrative manner. It is to be understood that the terminology which has been used is intended to be in the nature of words of description rather than of limitation.

Obviously, many modifications or variations of the present invention are possible in light of the above teachings. Therefore, within the scope of the appended claims, the present invention may be practiced otherwise than as specifically described.

What is claimed is:

1. A fastening assembly for securing a door trim panel to a door body inner panel, the assembly comprising:

a male member having a head portion adapted to be removably secured to a slot in the door trim panel, the male member having a cylindrical portion having a plurality of barbs spaced longitudinally along the longitudinal length of the cylindrical portion;

a female member including means for removably securing the female member to the door body inner panel, the female member having a cylindrical portion with a longitudinal axis, the cylindrical portion having a pocket formed therein along the longitudinal axis, the pocket extending from one end thereof and terminating short of the other end thereof, the pocket defining an opening at said one end, the pocket including means for engaging a groove between a pair of adjacent barbs on the male member for adjusting the door trim panel relative to the door body inner panel;

the engaging means comprising an annular ring extending radially inwardly into the pocket adjacent said opening, the female member including a plurality of circumferentially spaced and longitudinally extending ribs extending radially outwardly from the cylindrical portion;

a plurality of longitudinally extending slots formed in the cylindrical portion, each of the slots being disposed between an adjacent pair of ribs to allow the ribs to be deflected radially inwardly;

an annular groove formed between a first end of the ribs and the sealing portion, the door body inner panel being retained between the first end of the ribs and the seal portion;

the male member including a sealing flange extending radially outwardly from the cylindrical portion at one of the barbs;

the axle member including a gripping flange extending radially outwardly and spaced longitudinally from the sealing flange;

the male member including an annular head portion formed between and having a diameter less than the diameter of the gripping flange and sealing flange and adapted to be disposed in a slot formed in the door trim panel such that the door trim panel is disposed between the gripping flange and sealing flange; and the male member and female member being made of a plastic material.

* * * * *